United States Patent
Chuang et al.

(10) Patent No.: US 11,036,276 B2
(45) Date of Patent: *Jun. 15, 2021

(54) MITIGATION OF ON-CHIP SUPPLY VOLTAGE NOISE BY MONITORING SLOPE OF SUPPLY VOLTAGE BASED ON TIME-BASED SENSORS

(71) Applicant: International Business Machines Corporation, Armonk, NY (US)

(72) Inventors: Pierce I-Jen Chuang, Briarcliff Manor, NY (US); Phillip J. Restle, Katonah, NY (US); Christos Vezyrtzis, Elmsford, NY (US); Divya Pathak, Philadelphia, PA (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 42 days.

This patent is subject to a terminal disclaimer.

(21) Appl. No.: 16/540,692

(22) Filed: Aug. 14, 2019

(65) Prior Publication Data

US 2020/0019224 A1 Jan. 16, 2020

Related U.S. Application Data

(63) Continuation of application No. 15/257,047, filed on Sep. 6, 2016, now Pat. No. 10,437,311.

(51) Int. Cl.
*G06F 1/00* (2006.01)
*G06F 1/324* (2019.01)
(Continued)

(52) U.S. Cl.
CPC .............. *G06F 1/324* (2013.01); *G06F 1/305* (2013.01); *G06F 1/3296* (2013.01)

(58) Field of Classification Search
CPC ..................................................... G06F 1/324
See application file for complete search history.

(56) References Cited

U.S. PATENT DOCUMENTS

| 7,240,304 B2 | 7/2007 | Dutta et al. |
| 7,526,683 B1 | 4/2009 | Votta, Jr. et al. |

(Continued)

FOREIGN PATENT DOCUMENTS

| GB | 2 376 081 A | 12/2002 |
| WO | 2008/967213 A3 | 8/2008 |
| WO | 2015/119971 A1 | 8/2015 |

OTHER PUBLICATIONS

Yasuhiro Ogasahar Validation of a Full-Chip Simulation Model for Supply Noise and Delay Dependence on Average Voltage Drip with On-Chip Delay Measurement IEEE Transactions on Circuits and Systems—II: Express Briefs Oct. 2007 5 pages vol. 54 No. 10.

(Continued)

*Primary Examiner* — Mohammed H Rehman
(74) *Attorney, Agent, or Firm* — Amin, Turocy & Watson, LLP

(57) ABSTRACT

A voltage droop mitigation system, that includes a first processor core that executes computer executable components stored in a memory. A time-based sensor component generates digital data representing voltage values associated with a power supply. A filtering component digitally conditions the generated digital data, and an analysis component analyzes the conditioned data and determines slope of the power supply voltage and employs counters to determine rate of data change over time; and if the slope is negative and exceeds a first pre-determined value for a pre-determined time period. The system implements one or more voltage droop-reduction techniques at the first processor core; and the first processor core transmits at least one of the following (Continued)

types of information: its voltage value, slope information or decision to apply droop reduction to one or more other cores.

20 Claims, 13 Drawing Sheets

(51) Int. Cl.
    *G06F 1/3296* (2019.01)
    *G06F 1/30* (2006.01)

(56) References Cited

U.S. PATENT DOCUMENTS

| | | |
|---|---|---|
| 7,937,563 B2 | 5/2011 | Naffziger et al. |
| 7,979,261 B2 | 7/2011 | Matsuura |
| 8,619,459 B1 | 12/2013 | Nguyen et al. |
| 9,141,421 B2 | 9/2015 | Eisen et al. |
| 2005/0242868 A1 | 11/2005 | Lutkemeyer |
| 2005/0248390 A1 | 11/2005 | Frech et al. |
| 2006/0036980 A1 | 2/2006 | Kobayashi |
| 2006/0284227 A1 | 12/2006 | Kamiya |
| 2007/0044063 A1 | 2/2007 | Faour |
| 2007/0044837 A1 | 3/2007 | Simburger et al. |
| 2007/0164754 A1 | 7/2007 | Smith, III et al. |
| 2007/0222493 A1 | 9/2007 | Afentakis et al. |
| 2009/0189713 A1 | 7/2009 | Zhou |
| 2010/0141500 A1 | 6/2010 | Kawaguchi et al. |
| 2010/0229021 A1* | 9/2010 | Konstadinidis ......... G06F 1/305 713/601 |
| 2011/0260685 A1 | 10/2011 | Forsythe |
| 2013/0085697 A1* | 4/2013 | Lindahl .................. G06F 15/00 702/64 |
| 2014/0218826 A1 | 8/2014 | Majarov et al. |
| 2015/0229303 A1 | 8/2015 | Li |
| 2015/0378412 A1 | 12/2015 | Suryanarayanan et al. |
| 2016/0048187 A1* | 2/2016 | Zhang ................... G06F 1/3206 713/330 |
| 2017/0214399 A1 | 7/2017 | Zogopoulos et al. |

OTHER PUBLICATIONS

List of IBM Patents or Applications Treated as Related.
Non-Final Office Action received in U.S. Appl. No. 15/257,047 dated Jul. 10, 2018, 26 pages.
Zhang X. et al. "Characterizing and Evaluating Voltage Noise in Multi-Core Near-Threshold Processors" International Symposium on Low Power Electronics and Design 2013 pp. 82-87.
Bowman K. et al. "A 16nm Auto-Calibrating Dynamically Adaptive Clock Distribution for Maximizing Supply-Voltage-Droop Tolerance Across a Wide Operating Range" International Solid-State Circuits Conference ISSCC 2015 pp. 152-153.
"Takahashi C. et al. "A 16nm FinFET Heterogeneous Nona-Core SoC Complying with IS026262 ASIL-B: Achieving 10^-7 Random Hardware Failures per Hour Reliability" International Solid-State Circuits Conference ISSCC 2016pp. 80-81."
Non Final Office Action received in U.S. Appl. No. 15/257,078 dated Apr. 23, 2018, 28 pages.
Final Office Action received in U.S. Appl. No. 15/257,078 dated Aug. 28, 2018, 16 pages.
Final Office Action received in U.S. Appl. No. 15/257,047 dated Jan. 11, 2019, 24 pages.
Notice of Allowance received in U.S. Appl. No. 15/257,078 dated Dec. 5, 2018, 22 pages.
Notice of Allowance received in U.S. Appl. No. 15/257,047 dated May 31, 2019, 16 pages.

\* cited by examiner

MITIGATION OF ON-CHIP SUPPLY VOLTAGE NOISE BY MONITORING SLOPE OF SUPPLY VOLTAGE BASED ON TIME-BASED SENSORS

This invention was made with Government support under Contract No.: H98230-12-C-0325 awarded by National Security Agency. The Government has certain rights in this invention.

BACKGROUND

The subject disclosure relates to power supplies, and more specifically, to mitigation of on-chip supply voltage by monitoring slope of supply voltage based on time-based sensors.

SUMMARY

The following presents a summary to provide a basic understanding of one or more embodiments of the invention. This summary is not intended to identify key or critical elements, or delineate any scope of the particular embodiments or any scope of the claims. Its sole purpose is to present concepts in a simplified form as a prelude to the more detailed description that is presented later. In one or more embodiments described herein, devices, systems, computer-implemented methods, apparatus and/or computer program products that facilitate distributed graph databases for streaming data insertion and queries are described.

In an implementation, a computer-implemented method for reducing on-chip power-supply noise, comprises: digitally determining slope of a supply voltage at known voltage values or approximated voltage values; and if the slope negatively exceeds a first pre-determined value, apply droop reduction to mitigate effects of voltage drop.

In another implementation, a voltage droop mitigation system, comprises: a processor that executes computer executable components stored in a memory; a time-based sensor component that generates digital data representing voltage values associated with a power supply; a filtering component that digitally conditions the generated digital data; and an analysis component that analyzes the conditioned data and determines slope of the power supply voltage and employs counters to determine rate of data change over time; and if the slope is negative and negatively exceeds a first pre-determined value for a pre-determined time period, the system implements one or more voltage droop-reduction techniques.

In another implementation, a computer-implemented method for reducing on-chip power-supply noise, comprises: monitoring slope of a local core supply voltage; monitoring slope of a neighboring core supply voltage; if the slope at the local core supply voltage negatively exceeds a pre-determined value, apply droop reduction to the local core to mitigate effects of voltage drop; and the local core transmits at least one of the following types of information: its voltage value, slope information or decision to apply droop reduction to one or more other cores.

In yet another implementation, a voltage droop mitigation system, comprises: a first processor core that executes computer executable components stored in a memory; a time-based sensor component that generates digital data representing voltage values associated with a power supply; a filtering component that digitally conditions the generated digital data; an analysis component that analyzes the conditioned data and determines slope of the power supply voltage and employs counters to determine rate of data change over time; and if the slope is negative and negatively exceeds a first pre-determined value for a pre-determined time period, the system implements one or more voltage droop-reduction techniques at the first processor core; and wherein the first processor core transmits at least one of the following types of information: its voltage value, slope information or decision to apply droop reduction to one or more other cores.

In some embodiments, elements described in connection with the computer-implemented method(s) can be embodied in different forms such as a system, a computer program product, or another form.

DETAILED DESCRIPTION

The following detailed description is merely illustrative and is not intended to limit embodiments and/or application or uses of embodiments. Furthermore, there is no intention to be bound by any expressed or implied information presented in the preceding Background or Summary sections, or in the Detailed Description section.

One or more embodiments are now described with reference to the drawings, wherein like referenced numerals are used to refer to like elements throughout. In the following description, for purposes of explanation, numerous specific details are set forth in order to provide a more thorough understanding of the one or more embodiments. It is evident, however, in various cases, that the one or more embodiments can be practiced without these specific details.

When the supply current drawn by a processor suddenly increases, a large drop is created on the voltage power supply. If the power supply decreases below a certain point, the processor's functionality can be compromised. Traditionally, a large margin is added to the power supply voltage value, so that even when the drop happens the voltage will never reach that point. Techniques are employed to lessen effect of such drop. These traditional techniques monitor supply voltage and employ some counter-measure (e.g., reduce clock speed, throttle activity . . . ) when the power supply is detected to be below a threshold value. These counter-measures prevent the drop from reaching its maximum value. However, the threshold value is larger than the failure value, since the counter-measures cannot be applied infinitely fast, consequently even when they are applied the supply voltage still decreases some more.

The present innovation(s) reduces on-chip power-supply noise when there is a large and sudden increase in supply current. In other words, potential onset of a voltage drop is estimated early, so that counter-measures can be applied ahead of time. This results in reduction in power consumption in the processor chip because an applied voltage margin is reduced. More specifically, the innovation(s) provides a method (and system) for mitigating on-chip supply voltage noise by monitoring slope of the supply voltage using time-based sensors. When the slope of the power supply negatively exceeds a threshold, a supply droop is detected. Once droop is detected, one or more voltage-noise reduction techniques are pro-actively applied. In contrast to traditional schemes, instead of applying droop-reduction methods after the power supply is detected to drop below a certain threshold, the subject innovation monitors rate of decrease of supply voltage; and when the rate of decrease of the supply voltage is large enough, droop-reduction technique(s) are applied (even if the value of the voltage itself still has not decreased below traditional trigger levels). The innovation(s) facilitates reduction in power consumption of the processor chip, by reducing applied voltage margin.

Figure 1:
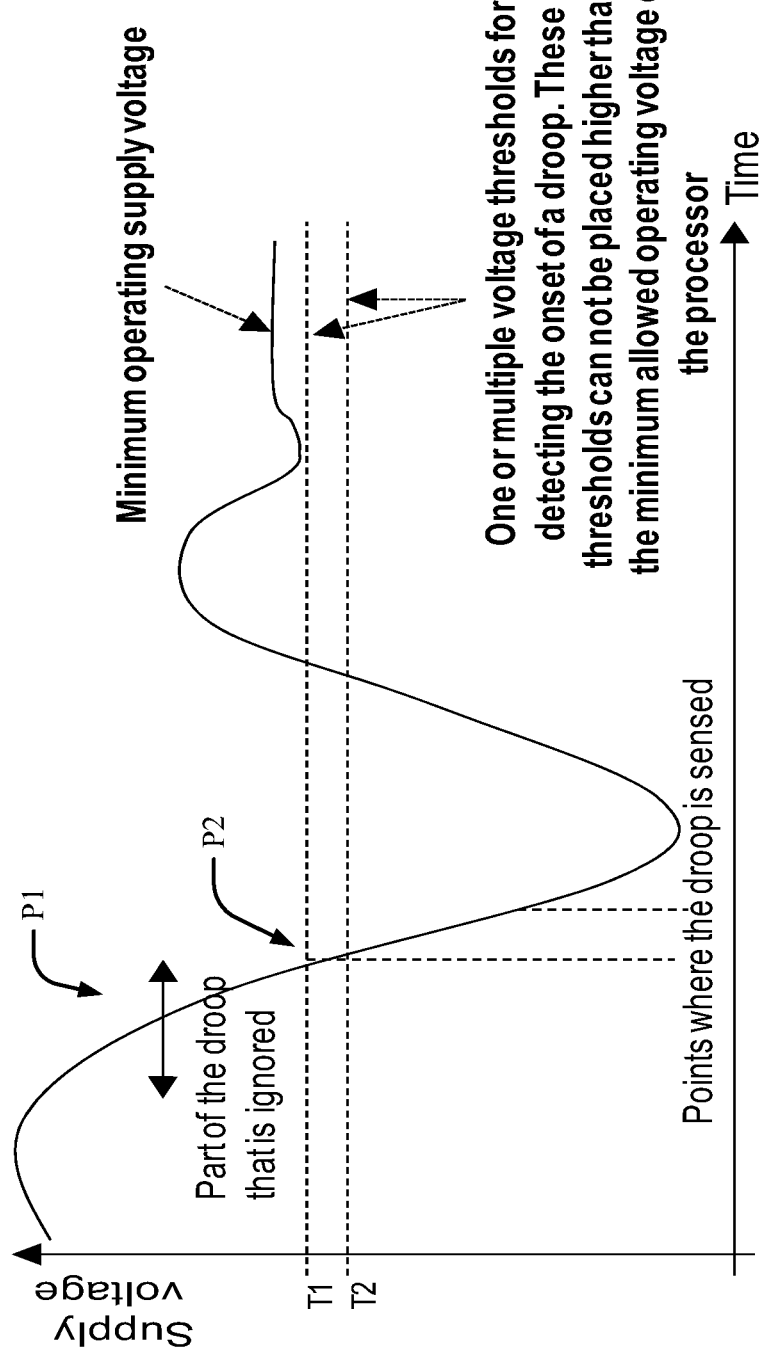
FIG. 1 illustrates traditional droop detection and mitigation.

FIG. 1 illustrates standard droop detection and mitigation. A supply droop is detected by comparing a power supply voltage against one or multiple threshold voltages (e.g., T1, T2, . . . )—these thresholds can not be arbitrarily high, or set higher than a minimum allowed operating voltage of the processor. Consequently, a supply droop is detected significantly late in most cases (e.g., at P2 rather than P1); and a significant portion of the droop is ignored. Accordingly, a large voltage margin is required to be added for protection against the part of the droop that is not mitigated.

Figure 2:
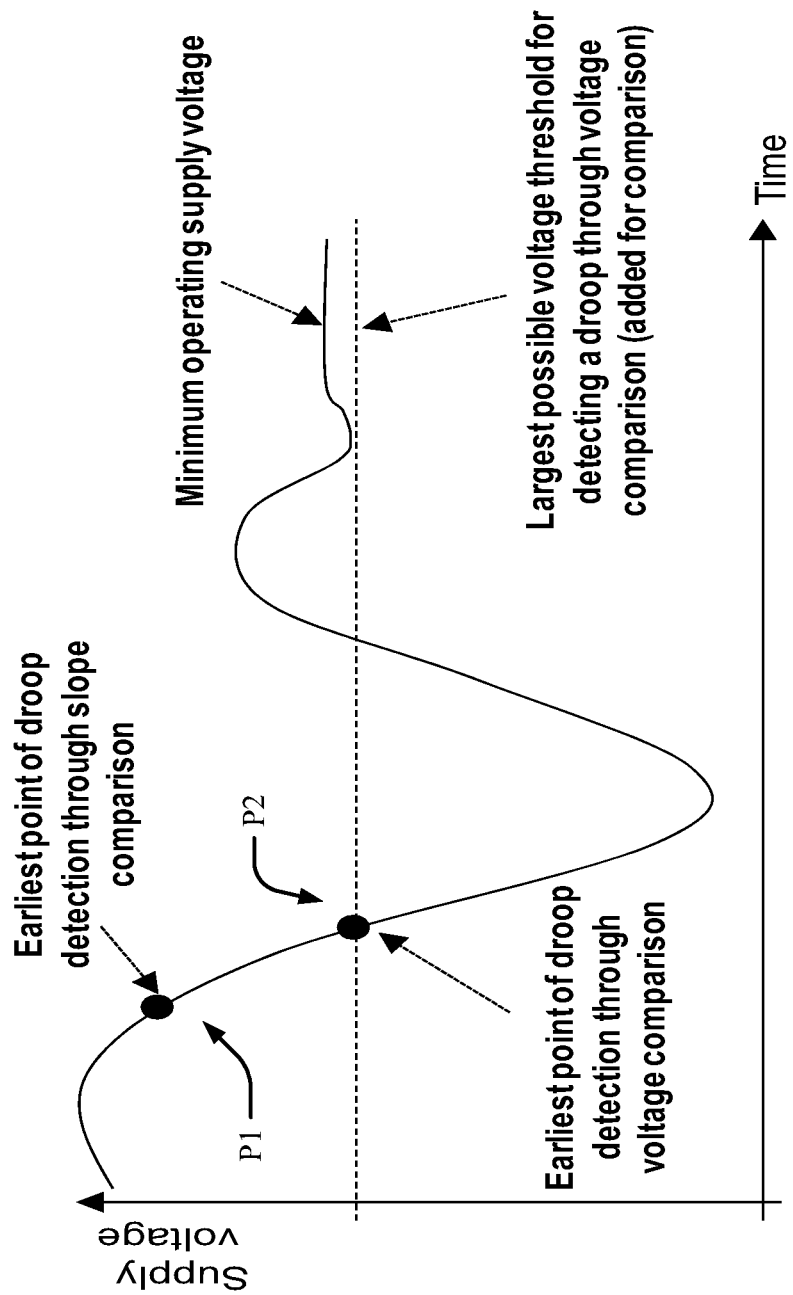
FIG. 2 illustrates droop detection and mitigation in accordance with one or more embodiments described herein.

FIG. 2 illustrates aspects of the subject innovation(s) in connection with droop detection and mitigation. Slope of a supply voltage is monitored, and one or more droop-reduction techniques are implemented if the slope negatively exceeds a particular value. Instead of employing voltage comparators with a few voltage thresholds as is typically done, supply voltage is monitored using a time-based sensor (e.g., such as Skitter or Critical-Path-Monitor). At respective cycles, a significant number of bits representing the supply voltage are analyzed. Slope of the supply voltage is determined through digital signal processing (DSP) performed on these bits. If the slope is calculated as negative with respect to a particular threshold, a droop is indicated on the supply voltage, even when the actual supply voltage is not below its minimum allowed value. This is because (typically) a large and fast voltage droop is coincident with a large voltage slope.

As evinced from FIG. 2, the earliest point (P1) of droop detection through slope comparison occurs substantially prior to the point (P2) of droop detection through standard analog voltage comparison of only high-frequency parts of the supply noise. Such analog schemes can be sensitive to $V_{dd}$ slope, and employed as a droop or overshoot sensor. However, due to the analog nature, the standard schemes for droop detection are relatively static or reactionary and consequently have a significant lag in detection as a result of not measuring the rate of $V_{dd}$ voltage change between two specified levels as compared to the subject innovations described and claimed herein. In the subject innovations, multiple voltage levels are known or approximated, as well as the time it takes transitioning across voltage levels, which is much more useful and accurate information than can be acquired traditionally, which generally requires fast analog voltage comparators. The subject innovation(s), based on digital-delay-lines, can be designed using standard digital circuits in most any standard-cell library. No analog circuits are required. Additionally, another issue with analog voltage detection techniques is that such techniques are very difficult to implement in the context of high-power microprocessors (e.g., server chips), due to usage of dual power supply domains and often requirements for large decoupling capacitors on both supply domains. Furthermore, the usage of analog techniques makes such circuits inherently more linear than circuits in connection with the subject digital solution innovations disclosed herein.

Figure 3:
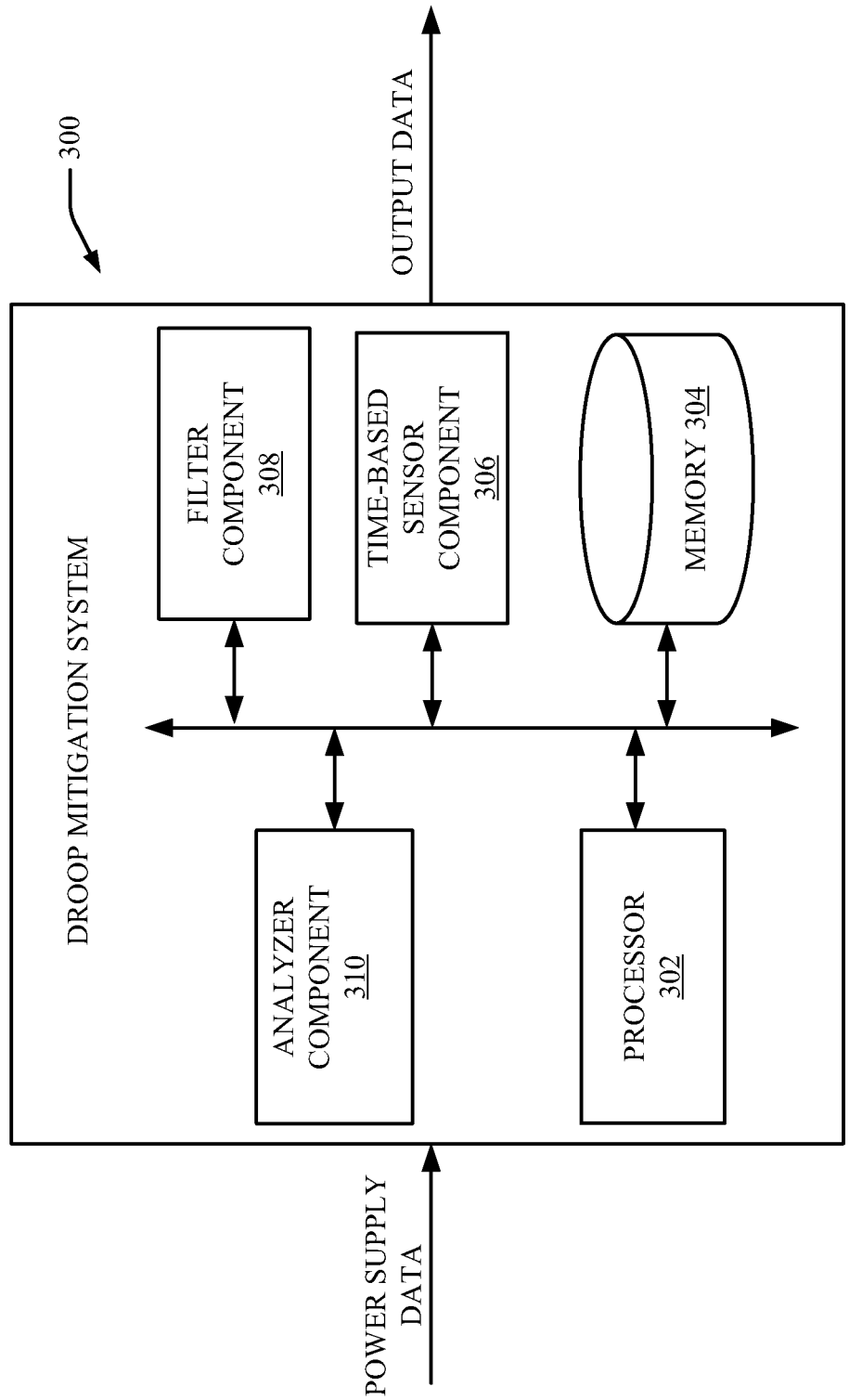
FIG. 3 illustrates a droop mitigation system in accordance with one or more embodiments described herein.

FIG. 3 illustrates a droop mitigation system 300 in accordance with an embodiment. The system 300 includes a processor 302 and memory 304 for executing and storing computer executable components and/or code in accordance with various implementations disclosed herein. The system 300 receives power supply data (e.g., voltage and/or current data) associated with a power supply, and a time-based sensor component 306 (e.g., Skitter or CPM) generates numerous bytes of data over respective cycles that digitally represent voltage values associated with the power supply. A filtering component 308 digitally conditions and/or processes the generated bytes of data. An analysis component 310 analyzes the data and determines slope of the supply voltage through the filtering and employing counters to gauge how fast the bits of data change over time. If the slope is negative below a pre-determined threshold for a pre-determined time period, the system 300 implements one or more droop-reduction techniques.

It is to be appreciated that in an embodiment, if the slope is negatively larger than another pre-determined value, droop reduction to mitigate effects of voltage drop is not applied. This is because if the negative slope is too large (e.g., negatively exceeds the another pre-determined value), the large negative slope may be due to high-frequency noise and accordingly droop mitigation techniques are not warranted.

In yet another implementation, the counter starts when voltage crosses a first threshold, then stops when it crosses another lower threshold. If the counter value is less than a pre-determined value, mitigation technique is triggered. However, if the counter value is less than another smaller pre-determined value, mitigation techniques are not initiated.

It should be appreciated that the threshold to apply droop mitigation technique is not just a fixed-value, but also depends on some previous history of the supply voltage. If the supply voltage is at a particular level for a long period of time, the pre-determined value can be increased or decreased in connection with improving efficiency of droop mitigation implementation.

Figure 4:
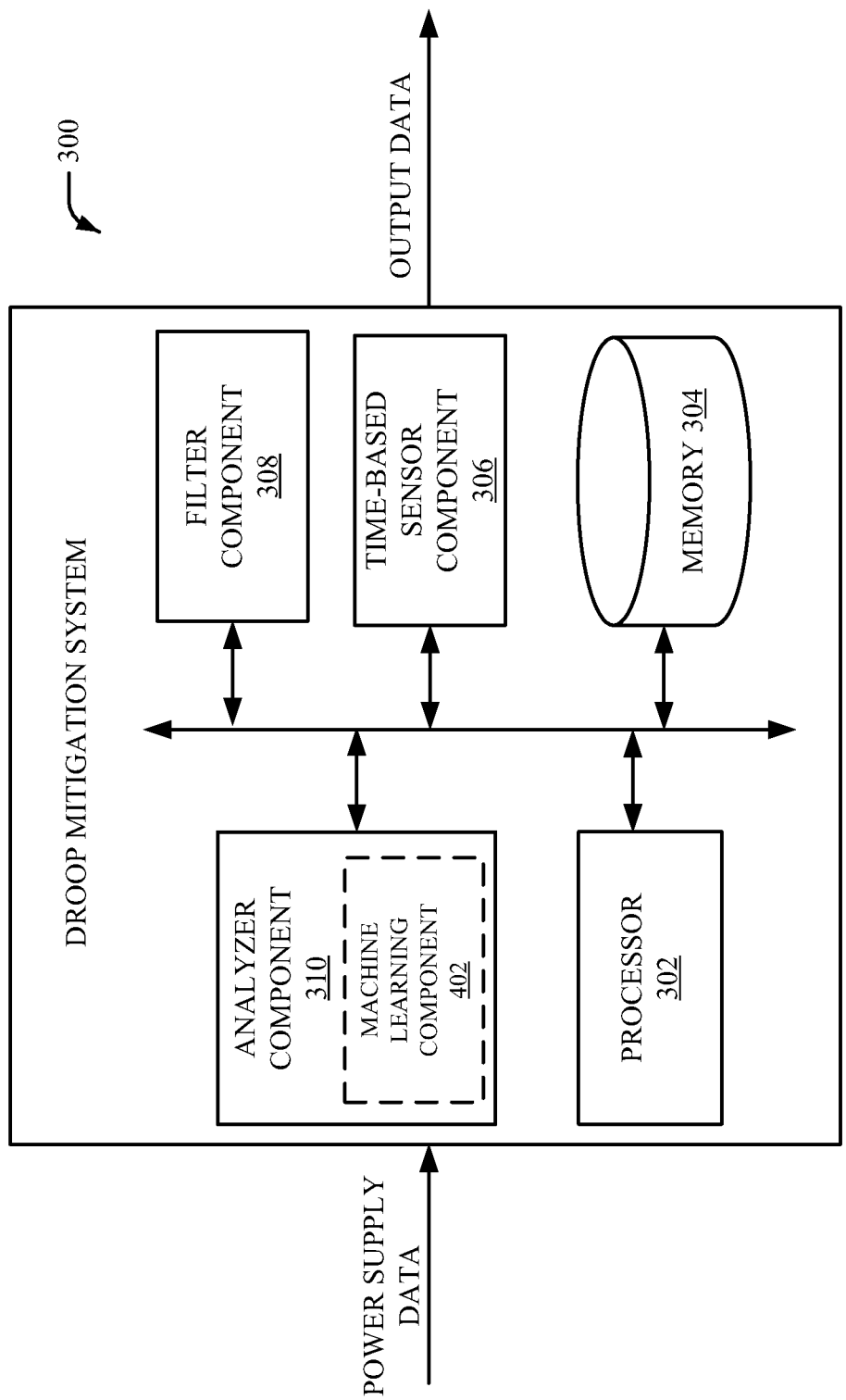
FIG. 4 illustrates an alternative embodiment of a droop mitigation system in accordance with one or more embodiments described herein.

FIG. 4 illustrates an alternative embodiment of the droop mitigation system 300 where the analyzer component 310 includes a machine learning component 402 that facilitates inferring, determining or predicting occurrence of droop at the power supply. In order to provide for or aid in the numerous inferences described herein (e.g. inferring, determining or predicting droop), components described herein can examine the entirety or a subset of voltage and/or current data to which it is granted access and can provide for reasoning about or infer states of the system, environment, etc. from a set of observations as captured via events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data.

Such inference can result in the construction of new events or actions from a set of observed events and/or stored event data, whether or not the events are correlated in close temporal proximity, and whether the events and data come from one or several event and data sources. Various classification (explicitly and/or implicitly trained) schemes and/or systems (e.g., support vector machines, neural networks, expert systems, Bayesian belief networks, fuzzy logic, data fusion engines, etc.) can be employed in connection with performing automatic and/or inferred action in connection with the claimed subject matter.

A classifier can map an input attribute vector, x=(x1, x2, x3, x4, xn), to a confidence that the input belongs to a class, as by f(x)=confidence(class). Such classification can employ a probabilistic and/or statistical-based analysis (e.g., factoring into the analysis utilities and costs) to prognose or infer an action that a user desires to be automatically performed. A support vector machine (SVM) is an example of a classifier that can be employed. The SVM operates by finding a hyper-surface in the space of possible inputs, where the hyper-surface attempts to split the triggering criteria from the non-triggering events. Intuitively, this makes the classification correct for testing data that is near, but not identical to training data. Other directed and undirected model classification approaches include, e.g., naïve Bayes, Bayesian networks, decision trees, neural networks, fuzzy logic models, and probabilistic classification models providing different patterns of independence can be employed. Classification as used herein also is inclusive of statistical regression that is utilized to develop models of priority.

Accordingly, based on respective threshold values crossed or not crossed, historical data as well as contextual data the system 300 can employ artificial intelligence in connection with a probabilistic-based analysis to infer, determine or predict droop. Moreover, a utility-based analysis can be employed where the cost of making an incorrect inference, determination or prediction can be weighed against the benefit of making a correct inference, determination or prediction.

Figure 5:
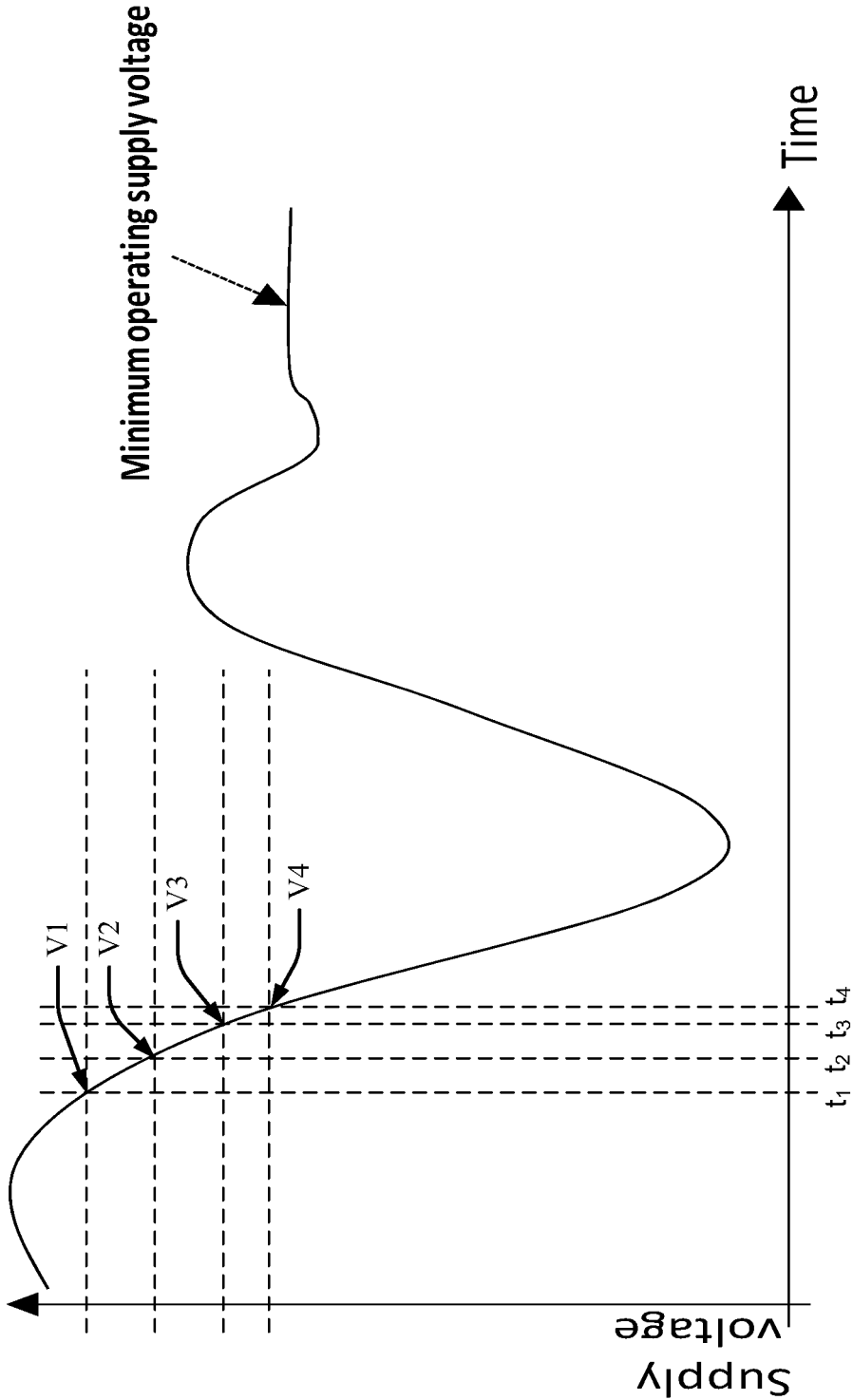
FIG. 5 illustrates an example voltage and slope analysis in accordance with one or more embodiments described herein.

FIG. 5 illustrates a voltage and slope analysis in connection with an implementation. A slope sensor employed in connection with this embodiment comprises two or more threshold sensors, combined with a method of calculating a time difference between a time that a first threshold ($V_1$) is crossed and another threshold ($V_2$) is crossed. Thus, not only is slope dV/dt measured, but rather slope is determined between two specific and known voltages (e.g., $V_1$ and $V_2$) or optionally approximated values. Starting with just two voltage thresholds $V_1$ and $V_2$, where $V_1 > V_2$. When using these two voltage to calculate slope, it is known that the power supply voltage crossed voltage threshold $V_1$ at time $t_1$, and then crossed another voltage threshold $V_2$ at a later time $t_2$. Thus, both threshold voltages ($V_1$, $V_2$), and both threshold crossing times, ($t_1$ and $t_2$) are known or approximated, allowing for calculation of a specific negative slope $(V_2-V_1)/(t_2-t_1)$. The calculated slope can be employed in connection with deciding droop mitigation actions. The foregoing provides more than a dV/dt value but also knowledge of specific voltage thresholds (e.g., $V_1$ and $V_2$) that were crossed. A traditional slope sensor might provide dV/dt, but not inform regarding actual voltages which is much less useful, e.g., in connection with identification of false positive(s) or occurrence of high frequency noise.

Still referring to FIG. 5, in another implementation multiple voltage thresholds can be employed, e.g., to provide greater certainty regarding droop prediction or determination. Instead of applying droop mitigation if $(V_2-V_1)/(t_2-t_1)$ exceeds a particular threshold, it is applied only when Slope($V_1$, $V_2$)<A and Slope($V_3$, $V_4$)<B, where A and B are two constants (mV/ns).

It is to be appreciated that the negative voltage slope for power supplie(s) can be calculated through multiple sets of points. More particularly, a number of different points (Vi, Vj) can be employed, and slope respectively calculated between each start and end of pair. Essentially, counts are made as to how many cycles are required to traverse from crossing Vi (in a negative sense, e.g., a falling supply voltage) to crossing Vj (same as prior, negative crossing). Then, these #of cycles are compared to a potentially different threshold. Still referring to FIG. 5, constraints can be set such as in a non-limiting example, a constraint of "undesirable" if (a) number of cycles for (V1,V2)<20 or (b) number of cycles for (V3,V4)<32, etc. Furthermore, it is to be appreciated that the specific order presented in FIG. 5 is merely one particular non-limiting example, and in other example implementations slopes between V1 and V3, and between V1 and V4, and between V2 and V4, etc. can be respectively calculated, and different thresholds employed for each.

Figure 6:
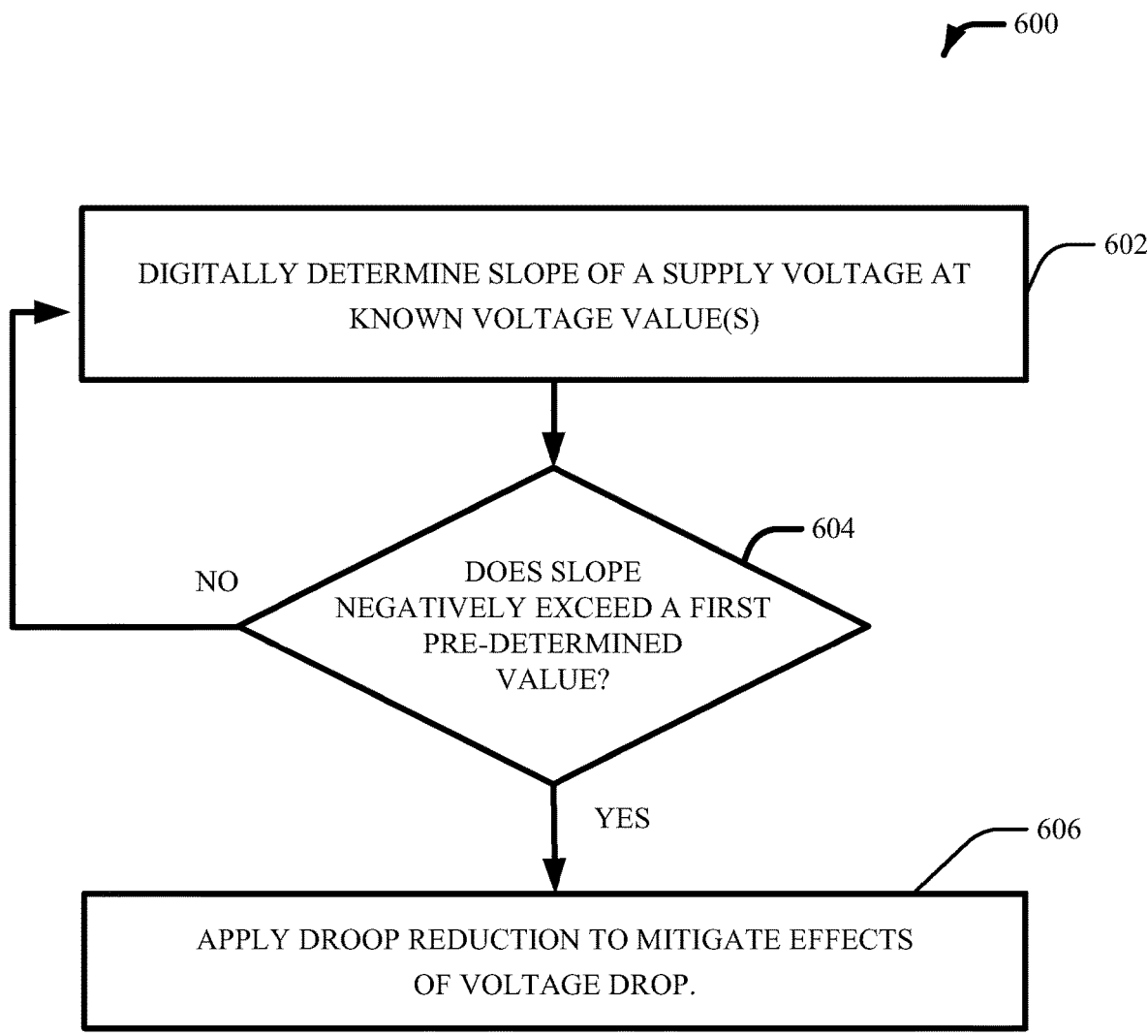
FIG. 6 illustrates an example, non-limiting method in accordance with one or more embodiments described herein.

FIG. 6 illustrates a flow diagram 600 in accordance with an implementation. At 602, slope of power supply voltage is digitally determined at known voltage values or approximated values. At 604, a determination is made regarding whether the slope negatively exceeds a predetermined value. If no, the process continues monitoring slope at 602. If yes, at 606 droop reduction techniques are implemented to mitigate effects of voltage drop.

Figure 7:
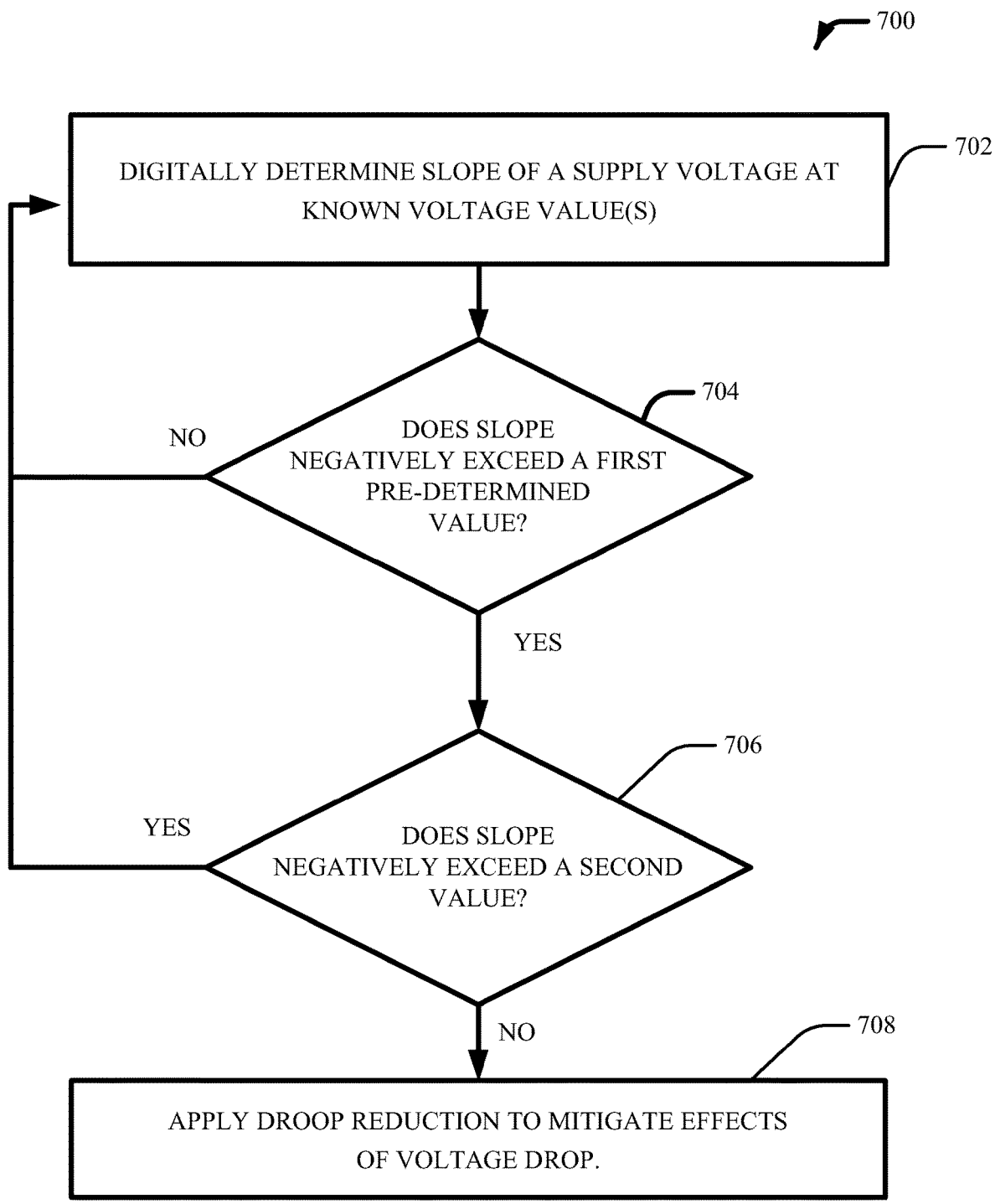
FIG. 7 illustrates an example, non-limiting method in accordance with one or more embodiments described herein.

FIG. 7 illustrates a flow diagram 700 in accordance with another implementation. At 702, slope of power supply voltage is digitally determined at known voltage values ($V_1$ and $V_2$) or approximated values. At 704, a determination is made regarding whether the slope negatively exceeds a first predetermined value. If no, the process continues monitoring slope at 602. If yes, at 706 a determination is made regarding whether the slope negatively exceeds a second predetermined value. If yes, the process continues monitoring slope at 702 since the negative slope is deemed too large (e.g., exceeds the second pre-determined value), and the large negative slope may be due to high-frequency noise and accordingly droop mitigation techniques are not warranted. If no at 708, droop reduction techniques are implemented to mitigate effects of voltage drop.

Figure 8:
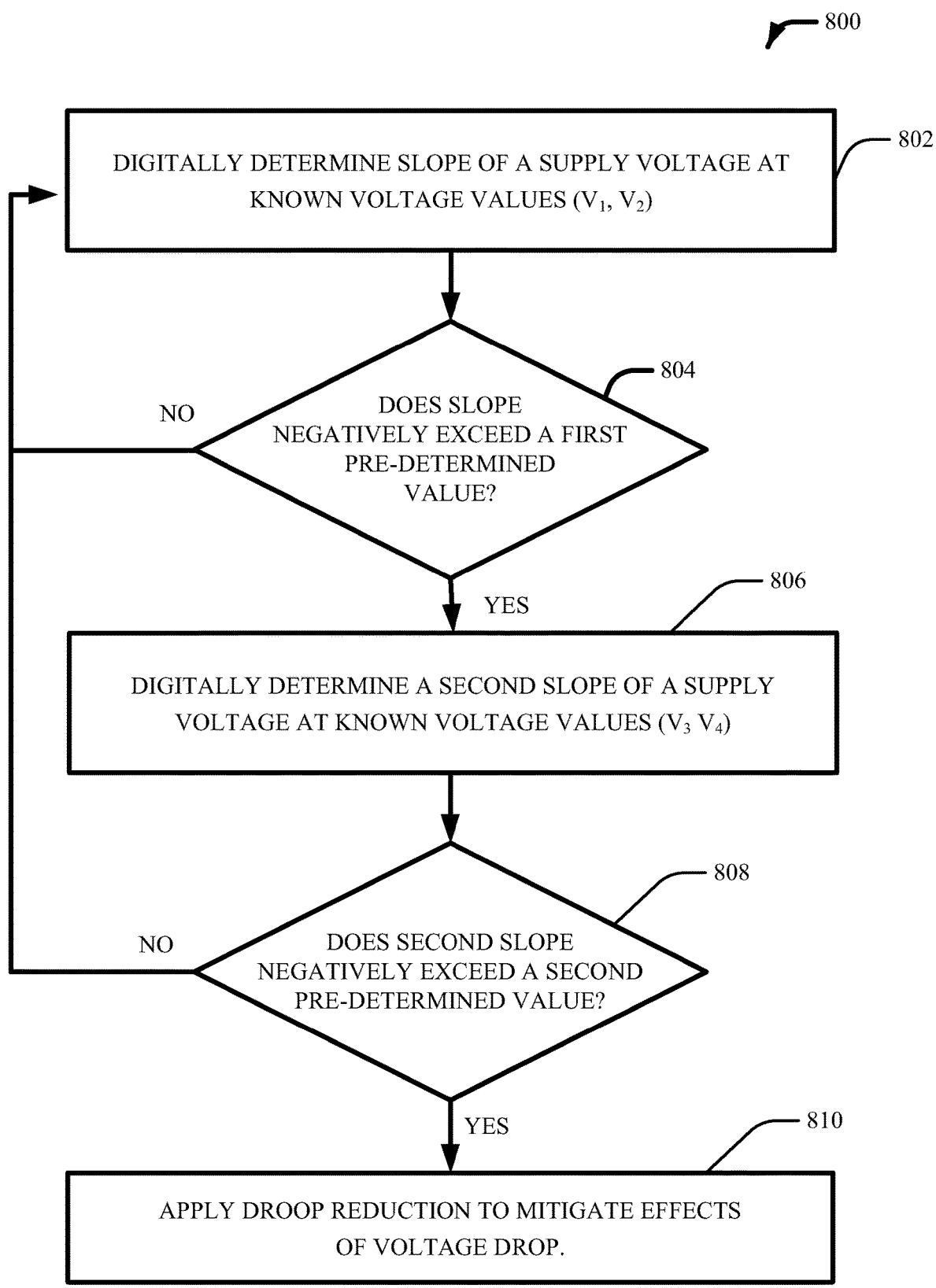
FIG. 8 illustrates an example, non-limiting method in accordance with one or more embodiments described herein.

FIG. 8 illustrates a flow diagram 800 in accordance with another implementation. At 802, slope of power supply voltage is digitally determined at known voltage values ($V_1$ and $V_2$) or approximated values. At 804, a determination is made regarding whether the slope negatively exceeds a first predetermined threshold value. If no, the process continues monitoring slope at 802. If yes, at 806 a second slope value of the power supply voltage is digitally determined at known voltage values ($V_3$ and $V_4$) or approximated values. At 808, a determination is made regarding whether the second slope negatively exceeds a second predetermined threshold value. If no, the process continues monitoring slope at 802. If yes at 810, droop reduction techniques are implemented to mitigate effects of voltage drop. It is to be appreciated that optionally the second pre-determined value can be the same at the first pre-determined threshold value.

Figure 9:
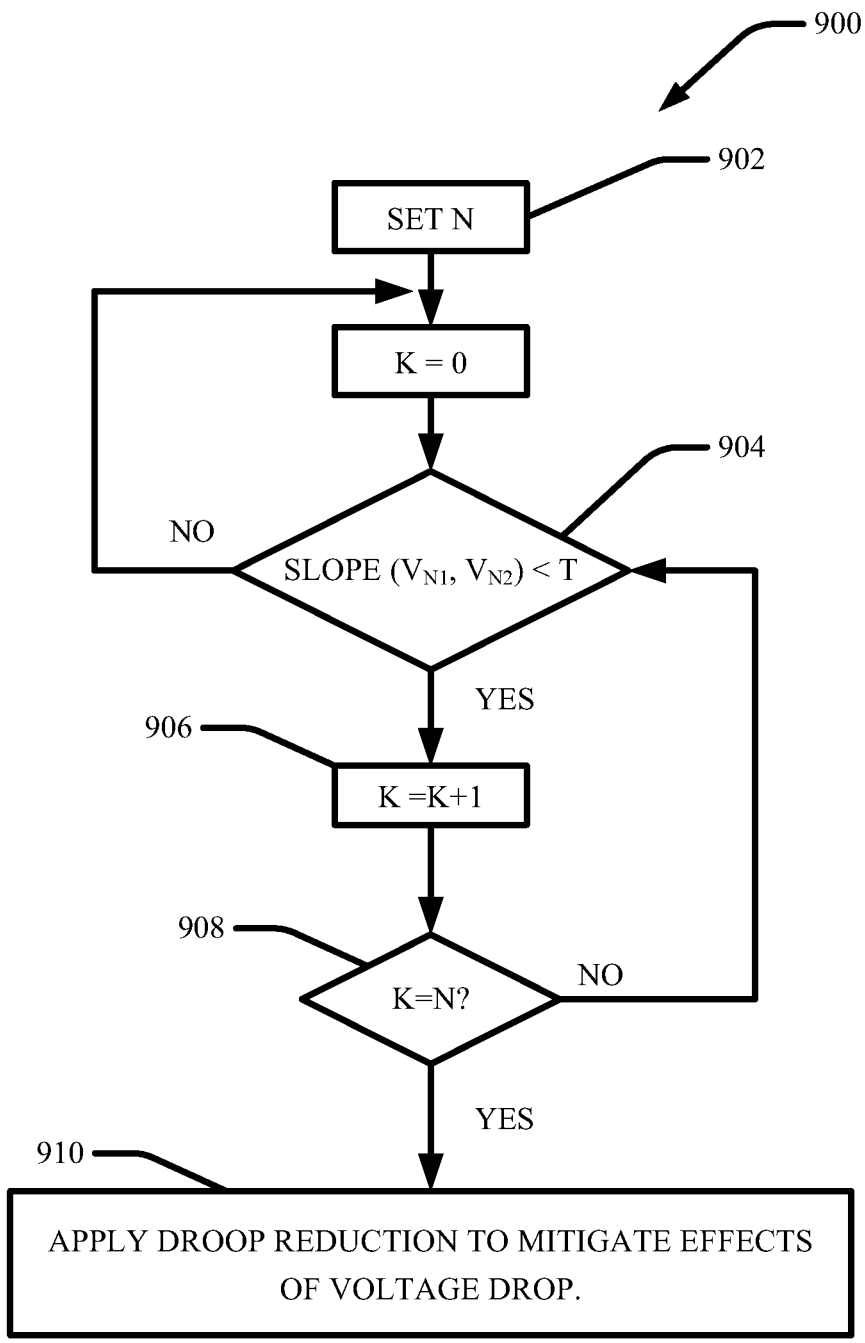
FIG. 9 illustrates an example, non-limiting method in accordance with one or more embodiments described herein.

FIG. 9 illustrates a flow diagram 900 in accordance with yet another implementation, where slope calculations can be iterated at N desired intervals wherein N is an integer. At 902, a value for N is set, this is the value for number of iterations of slope calculations to be performed in connection with a trending negative slope for power supply voltage. At 904, a determination is made if slope of the power supply at known voltage values ($V_{N1}$, $V_{N2}$) or approximated values is below a predetermined negative threshold value. If no, the process repeats at 904. If yes, a counter is incremented at 906. At 908, a determination is made if the counter value (K) has reached the value of N. If no, the process repeats at 904. If yes, the desired number of slope calculation iterations has reached the desired value N and then at 910 droop reduction techniques are implemented to mitigate effects of voltage drop.

Figure 10:
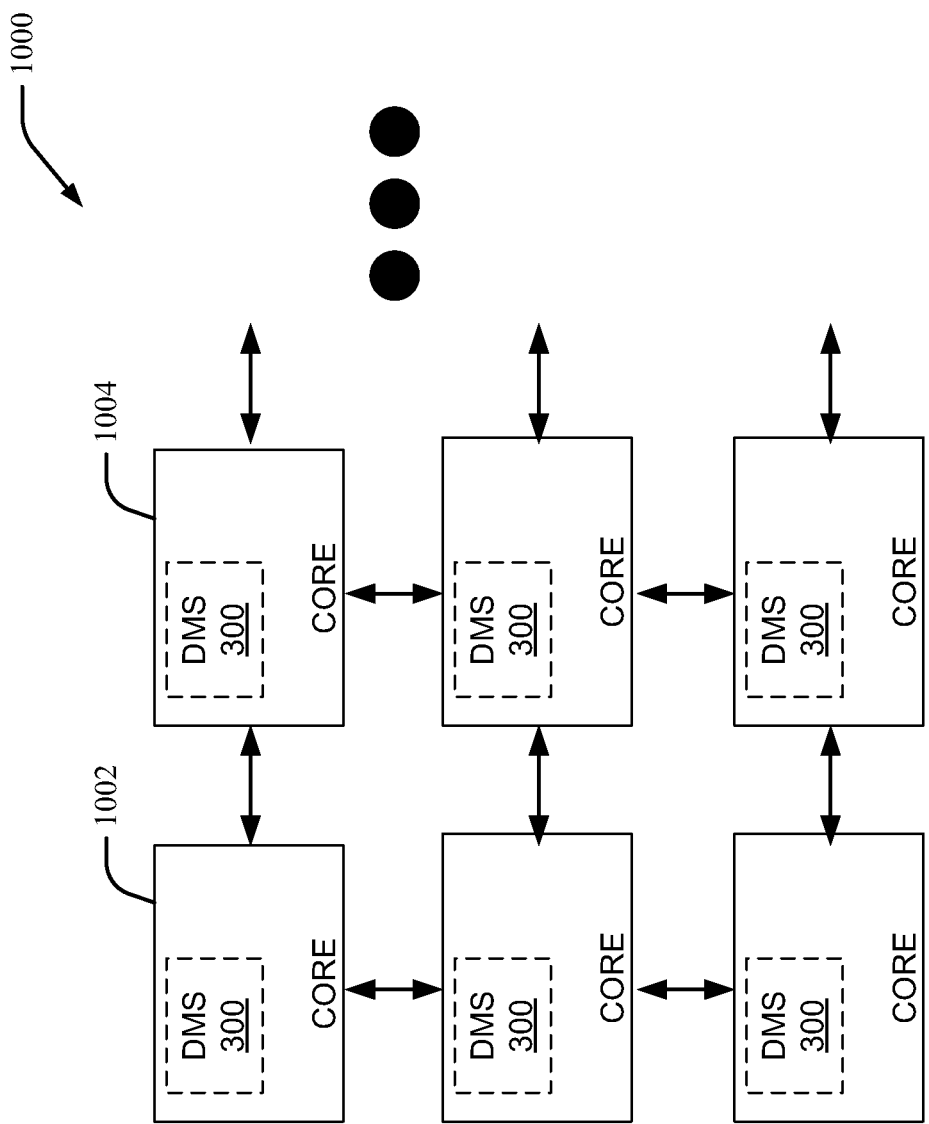
FIG. 10 illustrates an example, multi-core distributed droop mitigation architecture in accordance with one or more embodiments described herein.

FIG. 10 illustrates an implementation where a plurality of processor cores 1000 each comprise respective droop mitigation systems 300 that respectively implement droop mitigation. This implementation provides for a combination of both local core and non-local core (e.g., neighboring core(s)) voltage sensing and digital/analog process of sensed values. A decision to apply droop reduction techniques can depend on value and slope of local core supply voltage as well as neighboring core(s)' supply voltage information and respective core decision(s) to apply droop reduction techniques. In other words, application of droop mitigation can be a function of respective independent core decision making as well as collective decision making by two or more cores. It is to be appreciated that implementations are not restricted to utilizing data from just neighboring cores but rather certain implementations can utilize information from any subset of cores of a set of cores.

In an embodiment, slope at known voltage values or approximated values is monitored at a power supply of a local core 1002, and slope is monitored at known voltage values or approximated values for a power supply of a neighboring core 1004. If the slope at the local core 1002 supply voltage exceeds a pre-determined value, droop reduction is applied to the local core 1002 to mitigate effects of voltage drop; and the local core 1002 transmits at least one of: its voltage value, slope information or decision to apply droop reduction to the neighboring core 1004. The neighboring core 1004 utilizes the information received from core 1002 in connection with analyzing its own voltage slope analysis in connection with applying droop reduction to itself. The data received from core 1002 facilitates core 1004 in decision making e.g., avoiding false positives regarding voltage droop occurrence.

In another implementation, the neighboring core 1004 can utilize the information received from core 1002 to relax a condition to apply droop reduction, or tighten a condition to apply droop reduction.

In another implementation, droop reduction at the neighboring core 1004 is applied if the supply voltage at the neighboring core 1004 is below a higher threshold than an original set value.

In yet another implementation, droop reduction at the neighboring core 1004 is applied if a time taken for its supply voltage to cross two voltage levels is less than a larger pre-determined threshold.

It is to be appreciated that the detection should not be limited to just threshold and/or slope detection. The idea is not to treat each core as an independent unit but rather to utilize information from other cores to assist in droop mitigation decision making of its own core to either reduce response time or number of false positives.

Furthermore, as noted above, the implementations are not limited to just a neighboring core but instead are applicable to a subset or set of remote cores (e.g., through either direct connection or through a relay-like network, where a core passes its neighboring core information to other remote cores).

It is to be appreciated that in a particular implementation not every core of a set of cores shares information, and that a subset of cores can share voltage related information while another subset does not.

A distributed decision-making framework as described above employing core to core communications as compared to a centralized framework provides for reduced decision-making in connection with application of droop mitigation as well as rapid, targeted droop mitigation on a core by core basis while leveraging knowledge of surrounding cores.

Figure 11:
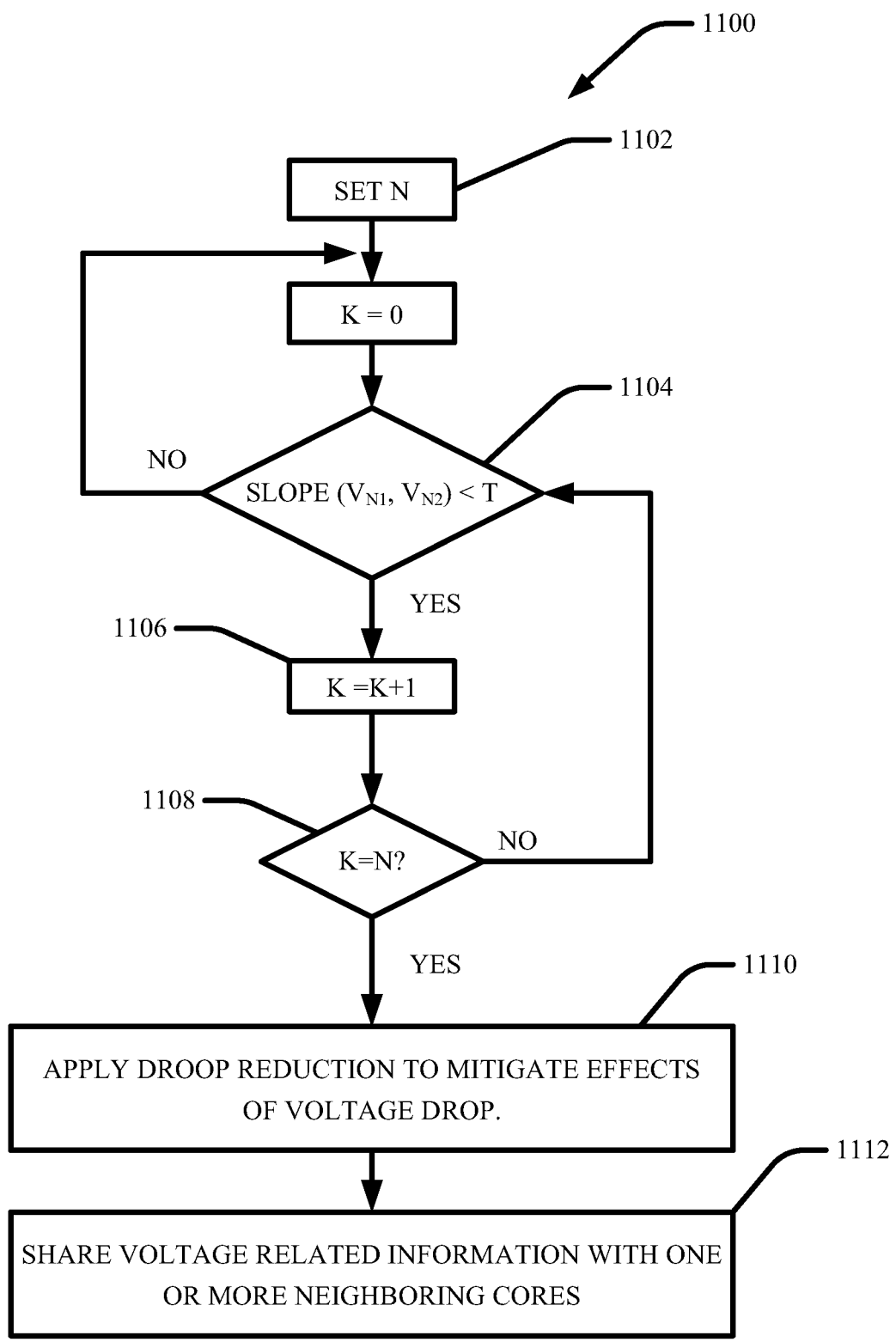
FIG. 11 illustrates an example, non-limiting method in accordance with one or more embodiments described herein.

FIG. 11 illustrates a flow diagram 1100 in accordance with yet another implementation, where slope calculations can be iterated at N desired intervals wherein N is an integer. At 1102, a value for N is set, this is the value for number of iterations of slope calculations to be determined in connection with a trending negative slope for power supply voltage. At 1104, a determination is made if slope of the power supply at known voltage values ($V_{N1}$, $V_{N2}$) or approximated values is below a predetermined negative threshold value for a local core. If no, the process repeats at 1104. If yes, a counter is incremented at 1106. At 1108, a determination is made if the counter value (K) has reached the value of N. If no, the process repeats at 1104. If yes, the desired number of slope calculation iterations has reached the desired value N then at 1110 droop reduction techniques are implemented to mitigate effects of voltage drop. At 1112, voltage related information pertaining to the local core is transmitted to one or more cores of a set of cores.

Figure 12:
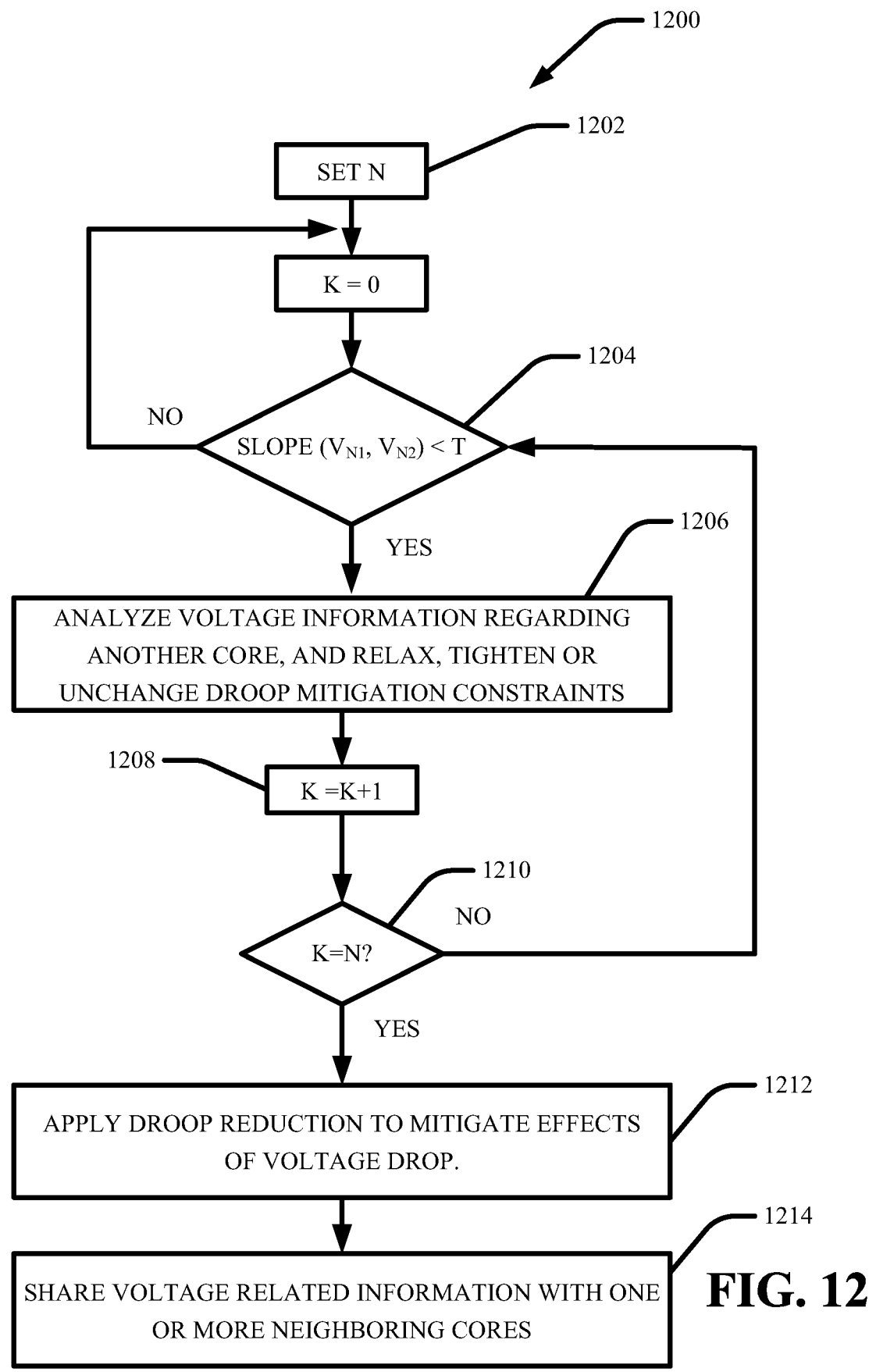
FIG. 12 illustrates an example, non-limiting method in accordance with one or more embodiments described herein.

FIG. 12 illustrates a flow diagram 1200 in accordance with yet another implementation, where slope calculations can be iterated at N desired intervals wherein N is an integer. At 1202, a value for N is set, this is the value for number of iterations of slope calculations to be determined in connection with a trending negative slope for power supply voltage. At 1204, a determination is made if slope of the power supply at known voltage values ($V_{N1}$, $V_{N2}$) or approximated values is below a predetermined negative threshold value. If no, the process repeats at 1204. If yes, at 1206 voltage related information received from another core is analyzed and constraints relating to application of droop mitigation for the subject core are relaxed, tightened or left unchanged as a function of the analysis. At 1208, a counter is incremented. At 1210, a determination is made if the counter value (K) has reached the value of N. If no, the process repeats at 1204. If yes, the desired number of slope calculation iterations has reached the desired value N then at 1212 droop reduction techniques are implemented to mitigate effects of voltage drop. At 1214, voltage related information pertaining to the subject core is shared with one or more cores of a set of cores.

Further to FIG. 4, the machine learning component(s) 402 of one or more DMSs 300 of respective cores 1000 can learn voltage related data received from one or more other cores and employ probabilistic-based analyses to infer or determine probability of voltage droop occurrence. As discussed supra, a utility-based analysis can be performed to take droop mitigation action factoring the benefit of taking correct action versus the cost of taking incorrect action. Utilization of voltage related information from one or more other cores can greatly increase confidence scores associated with voltage droop prediction. Furthermore, pre-emptive remediation measures can be taken at a single core in order to avoid a multi-core voltage droop avalanche from occurring.

Figure 13:
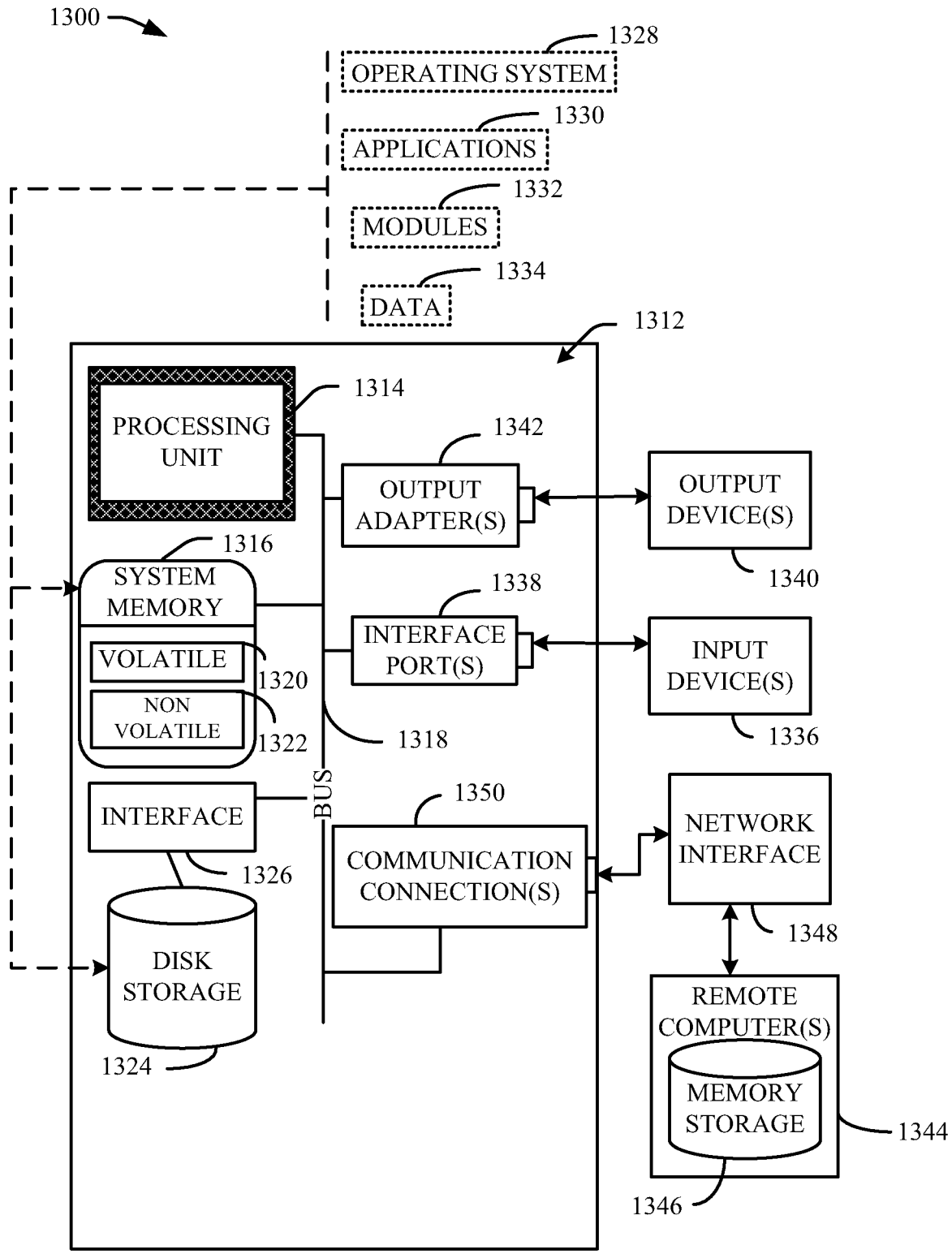
FIG. 13 illustrates a block diagram of an example, non-limiting operating environment in which one or more embodiments described herein can be facilitated.

In order to provide a context for the various aspects of the disclosed subject matter, FIG. 13 as well as the following discussion are intended to provide a general description of a suitable environment in which the various aspects of the disclosed subject matter can be implemented. FIG. 13 illustrates a block diagram of an example, non-limiting operating environment in which one or more embodiments described herein can be facilitated. Repetitive description of like elements employed in other embodiments described herein is omitted for sake of brevity.

With reference to FIG. 13, a suitable operating environment 1300 for implementing various aspects of this disclosure can also include a computer 1312. The computer 1312 can also include a processing unit 1314, a system memory 1316, and a system bus 1318. The system bus 1318 couples system components including, but not limited to, the system memory 1316 to the processing unit 1314. The processing unit 1314 can be any of various available processors. Dual microprocessors and other multiprocessor architectures also can be employed as the processing unit 1314. The system bus 1318 can be any of several types of bus structure(s) including the memory bus or memory controller, a peripheral bus or external bus, and/or a local bus using any variety of available bus architectures including, but not limited to, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Card Bus, Universal Serial Bus (USB), Advanced Graphics Port (AGP), Firewire (IEEE 1394), and Small Computer Systems Interface (SCSI).

The system memory 1316 can also include volatile memory 1320 and nonvolatile memory 1322. The basic input/output system (BIOS), containing the basic routines to transfer information between elements within the computer 1312, such as during start-up, is stored in nonvolatile memory 1322. Computer 1312 can also include removable/non-removable, volatile/non-volatile computer storage media. FIG. 13 illustrates, for example, a disk storage 1324. Disk storage 1324 can also include, but is not limited to, devices like a magnetic disk drive, floppy disk drive, tape drive, Jaz drive, Zip drive, LS-100 drive, flash memory card, or memory stick. The disk storage 1324 also can include storage media separately or in combination with other storage media. To facilitate connection of the disk storage 1324 to the system bus 1318, a removable or non-removable interface is typically used, such as interface 1326. FIG. 13 also depicts software that acts as an intermediary between users and the basic computer resources described in the suitable operating environment 1300. Such software can also include, for example, an operating system 1328. Operating system 1328, which can be stored on disk storage 1324, acts to control and allocate resources of the computer 1312.

System applications 1330 take advantage of the management of resources by operating system 1328 through program modules 1332 and program data 1334, e.g., stored either in system memory 1316 or on disk storage 1324. It is to be appreciated that this disclosure can be implemented with various operating systems or combinations of operating systems. A user enters commands or information into the computer 1312 through input device(s) 1336. Input devices 1336 include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to the processing unit 1314 through the system bus 1318 via interface port(s) 1338. Interface port(s) 1338 include, for example, a serial port, a parallel port, a game port, and a universal serial bus (USB). Output device(s) 1340 use some of the same type of ports as input device(s) 1336. Thus, for example, a USB port can be used to provide input to computer 1312, and to output information from computer 1312 to an output device 1340. Output adapter 1342 is provided to illustrate that there are some output devices 1340 like monitors, speakers, and printers, among other output devices 1340, which require special adapters. The output adapters 1342 include, by way of illustration and not limitation, video and sound cards that provide a means of connection between the output device 1340 and the system bus 1318. It should be noted that other devices and/or systems of devices provide both input and output capabilities such as remote computer(s) 1344.

Computer 1312 can operate in a networked environment using logical connections to one or more remote computers, such as remote computer(s) 1344. The remote computer(s) 1344 can be a computer, a server, a router, a network PC, a workstation, a microprocessor based appliance, a peer device or other common network node and the like, and typically can also include many or all of the elements described relative to computer 1312. For purposes of brevity, only a memory storage device 1346 is illustrated with remote computer(s) 1344. Remote computer(s) 1344 is logically connected to computer 1312 through a network interface 1348 and then physically connected via communication connection 1350. Network interface 1348 encompasses wire and/or wireless communication networks such as local-area networks (LAN), wide-area networks (WAN), cellular networks, etc. LAN technologies include Fiber Distributed Data Interface (FDDI), Copper Distributed Data Interface (CDDI), Ethernet, Token Ring and the like. WAN technologies include, but are not limited to, point-to-point links, circuit switching networks like Integrated Services Digital Networks (ISDN) and variations thereon, packet switching networks, and Digital Subscriber Lines (DSL). Communication connection(s) 1350 refers to the hardware/software employed to connect the network interface 1348 to the system bus 1318. While communication connection 1350 is shown for illustrative clarity inside computer 1312, it can also be external to computer 1312. The hardware/software for connection to the network interface 1348 can also include, for exemplary purposes only, internal and external technologies such as, modems including regular telephone grade modems, cable modems and DSL modems, ISDN adapters, and Ethernet cards.

The present invention may be a system, a method, an apparatus and/or a computer program product at any possible technical detail level of integration. The computer program product can include a computer readable storage medium (or media) having computer readable program instructions thereon for causing a processor to carry out aspects of the present invention. The computer readable storage medium can be a tangible device that can retain and store instructions for use by an instruction execution device. The computer readable storage medium can be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium can also include the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network can comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device. Computer readable program instructions for carrying out operations of the present invention can be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions can execute entirely on the user's computer, partly on the user's computer, as a stand-alone software package, partly on the user's computer and partly on a remote computer or entirely on the remote computer or server. In the latter scenario, the remote computer can be connected to the user's computer through any type of network, including a local area network (LAN) or a wide area network (WAN), or the connection can be made to an external computer (for example, through the Internet using an Internet Service Provider). In some embodiments, electronic circuitry including, for example, programmable logic circuitry, field-programmable gate arrays (FPGA), or programmable logic arrays (PLA) can execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions. These computer readable program instructions can be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions can also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks. The computer readable program instructions can also be loaded onto a computer, other programmable data processing apparatus, or other device to cause a series of operational acts to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams can represent a module, segment, or portion of instructions, which comprises one or more executable instructions for implementing the specified logical function(s). In some alternative implementations, the functions noted in the blocks can occur out of the order noted in the Figures. For example, two blocks shown in succession can, in fact, be executed substantially concurrently, or the blocks can sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While the subject matter has been described above in the general context of computer-executable instructions of a computer program product that runs on a computer and/or computers, those skilled in the art will recognize that this disclosure also can or can be implemented in combination with other program modules. Generally, program modules include routines, programs, components, data structures, etc. that perform particular tasks and/or implement particular abstract data types. Moreover, those skilled in the art will appreciate that the inventive computer-implemented methods can be practiced with other computer system configurations, including single-processor or multiprocessor computer systems, mini-computing devices, mainframe computers, as well as computers, hand-held computing devices (e.g., PDA, phone), microprocessor-based or programmable consumer or industrial electronics, and the like. The illustrated aspects can also be practiced in distributed computing environments in which tasks are performed by remote processing devices that are linked through a communications network. However, some, if not all aspects of this disclosure can be practiced on stand-alone computers. In a distributed computing environment, program modules can be located in both local and remote memory storage devices.

As used in this application, the terms "component," "system," "platform," "interface," and the like, can refer to and/or can include a computer-related entity or an entity related to an operational machine with one or more specific functionalities. The entities disclosed herein can be either hardware, a combination of hardware and software, software, or software in execution. For example, a component can be, but is not limited to being, a process running on a processor, a processor, an object, an executable, a thread of execution, a program, and/or a computer. By way of illustration, both an application running on a server and the server can be a component. One or more components can reside within a process and/or thread of execution and a component can be localized on one computer and/or distributed between two or more computers. In another example, respective components can execute from various computer readable media having various data structures stored thereon. The components can communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or firmware application executed by a processor. In such a case, the processor can be internal or external to the apparatus and can execute at least a part of the software or firmware application. As yet another example, a component can be an apparatus that provides specific functionality through electronic components without mechanical parts, wherein the electronic components can include a processor or other means to execute software or firmware that confers at least in part the functionality of the electronic components. In an aspect, a component can emulate an electronic component via a virtual machine, e.g., within a cloud computing system.

In addition, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. Moreover, articles "a" and "an" as used in the subject specification and annexed drawings should generally be construed to mean "one or more" unless specified otherwise or clear from context to be directed to a singular form. As used herein, the terms "example" and/or "exemplary" are utilized to mean serving as an example, instance, or illustration. For the avoidance of doubt, the subject matter disclosed herein is not limited by such examples. In addition, any aspect or design described herein as an "example" and/or "exemplary" is not necessarily to be construed as preferred or advantageous over other aspects or designs, nor is it meant to preclude equivalent exemplary structures and techniques known to those of ordinary skill in the art.

As it is employed in the subject specification, the term "processor" can refer to substantially any computing processing unit or device comprising, but not limited to, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, or any combination thereof designed to perform the functions described herein. Further, processors can exploit nano-scale architectures such as, but not limited to, molecular and quantum-dot based transistors, switches and gates, in order to optimize space usage or enhance performance of user equipment. A processor can also be implemented as a combination of computing processing units. In this disclosure, terms such as "store," "storage," "data store," "data storage," "database," and substantially any other information storage component relevant to operation and functionality of a component are utilized to refer to "memory components," entities embodied in a "memory," or components comprising a memory. It is to be appreciated that memory and/or memory components described herein can be either volatile memory or nonvolatile memory, or can include both volatile and nonvolatile memory. By way of illustration, and not limitation, nonvolatile memory can include read only memory (ROM), programmable ROM (PROM), electrically programmable ROM (EPROM), electrically erasable ROM (EEPROM), flash memory, or non-volatile random access memory (RAM) (e.g., ferroelectric RAM (FeRAM). Volatile memory can include RAM, which can act as external cache memory, for example. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), direct Rambus RAM (DRRAM), direct Rambus dynamic RAM (DRDRAM), and Rambus dynamic RAM (RDRAM). Additionally, the disclosed memory components of systems or computer-implemented methods herein are intended to include, without being limited to including, these and any other suitable types of memory.

What has been described above include mere examples of systems and computer-implemented methods. It is, of course, not possible to describe every conceivable combination of components or computer-implemented methods for purposes of describing this disclosure, but one of ordinary skill in the art can recognize that many further combinations and permutations of this disclosure are possible. Furthermore, to the extent that the terms "includes," "has," "possesses," and the like are used in the detailed description, claims, appendices and drawings such terms are intended to be inclusive in a manner similar to the term "comprising" as "comprising" is interpreted when employed as a transitional word in a claim.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method for reducing on-chip power-supply noise, comprising:
   using a time-based voltage sensor to digitally determine slope of a supply voltage at known or approximated voltage values, wherein the digitally determining slope comprises:
      employing a digital-delay-line in the time-based voltage sensor that generates a a first supply voltage value at a first time and a second supply voltage value at a second time; and
      estimating slope of the supply voltage by dividing a difference between the first and second supply voltage values by an elapsed time interval;
      wherein the employing the digital-delay-line and employing a counter mitigate circuit linearity; and
   if the slope negatively exceeds a first pre-determined value, apply droop reduction to mitigate effects of voltage drop.

2. The method of claim 1, wherein if the slope negatively exceeds a second pre-determined value then forego droop reduction.

3. The method of claim 2, wherein the second pre-determined value is indicative of high-frequency noise occurrence.

4. The method of claim 1, further comprising employing the counter to tracks a number of interim cycles between the first time and the second time to determine the elapsed time interval.

5. The method of claim 1, comprising analyzing the first and second sets of voltage values with digital signal processing.

6. The method of claim 1, wherein if the monitored slope is calculated as negative below the predetermined threshold identify a droop condition on the supply voltage.

7. The method of claim 5, wherein a filter is applied to an output of the time-based voltage sensor.

8. The method of claim 6, wherein the droop reduction is applied if the slope remains negative for a predetermined time period.

9. The method of claim 1, wherein if the supply voltage is at a particular level for a set duration of time, the pre-determined value is increased or decreased.

10. The method of claim 9, wherein the change to the pre-determined value is based at least in part on historical values of the supply voltage.

11. A voltage droop mitigation system, comprising:
   a processor that executes computer executable components stored in a memory;
   a time-based voltage sensor component that generates digital data representing voltage values associated with a power supply;
   a digital-delay-line in the time-based voltage sensor component that generates over a first supply voltage value at a first time and a second supply voltage value at a second time;
   a counter that tracks a number of interim cycles between the first time and the second time to determine an elapsed time interval;
   a filtering component that digitally conditions generated digital data; and
   an analysis component that analyzes the conditioned data and digitally determines slope of the power supply voltage by dividing a difference between the first and second supply voltage values by the elapsed time interval, wherein the digitally determining slope mitigates circuit linearity; and if the slope is negative and exceeds a first pre-determined value for a pre-determined time period, the system implements one or more voltage droop-reduction techniques.

12. The system of claim 11, wherein if the slope negatively exceeds a second pre-determined value then implementation of the one or more voltage droop-reduction techniques is abandoned.

13. The system of claim 12, wherein the second pre-determined value is indicative of high-frequency noise occurrence.

14. The system of claim 11, wherein if the power supply voltage is at a particular level for a set duration of time, the first pre-determined value is increased or decreased by the analysis component.

15. The system of claim 14, wherein the analysis component changes the pre-determined value based at least in part on historical values of the supply voltage.

16. A computer program product that reduces on-chip power-supply noise, the computer program product comprising a non-transitory computer readable storage medium having program instructions embodied therewith, the program instructions executable by a processing component to cause the processing component to:
   digitally determine, by a time-based voltage sensor, slope of a supply voltage at known or approximated voltage values, wherein the digitally determining slope comprises:
      employing a digital-delay-line in the time-based voltage sensor that generates over one or more cycles a first supply voltage value at a first time and a second supply voltage value at a second time; and
      estimating the slope of the supply voltage by dividing a difference between the first and second supply voltage values by an elapsed time interval;
      wherein the employing the digital-delay-line and the employing the counter mitigate circuit linearity; and
   if the slope negatively exceeds a first pre-determined value, apply droop reduction to mitigate effects of voltage drop.

17. The computer program product of claim 16, wherein if the slope negatively exceeds a second pre-determined value then forego droop reduction.

18. The computer program product of claim 16, wherein if the monitored slope is calculated as negative below the predetermined threshold identify a droop condition on the supply voltage.

19. The computer program product of claim 16, wherein a filter is applied to an output of the time-based voltage sensor.

20. The computer program product of claim 16, wherein if the supply voltage is at a particular level for a set duration of time, the pre-determined value is increased or decreased; and wherein the change to the pre-determined value is based at least in part on historical values of the supply voltage.

* * * * *